E. OLIVER.
SPLIT DEMOUNTABLE RIM.
APPLICATION FILED AUG. 3, 1917.
1,293,893.
Patented Feb. 11, 1919.
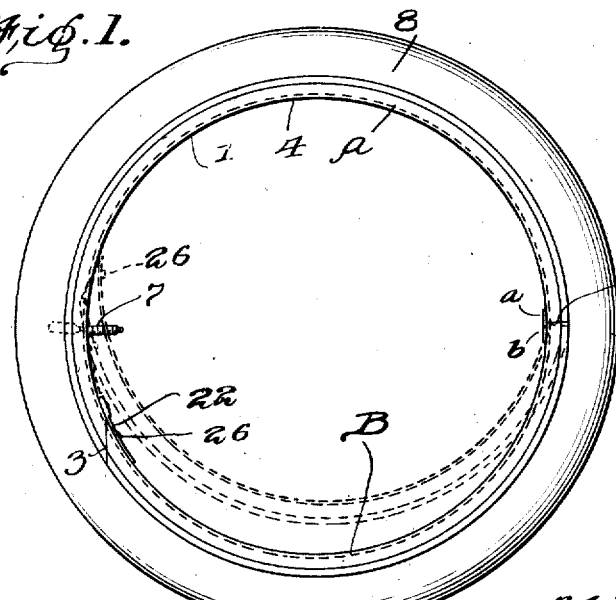
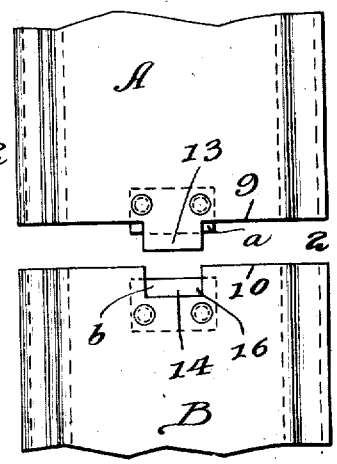
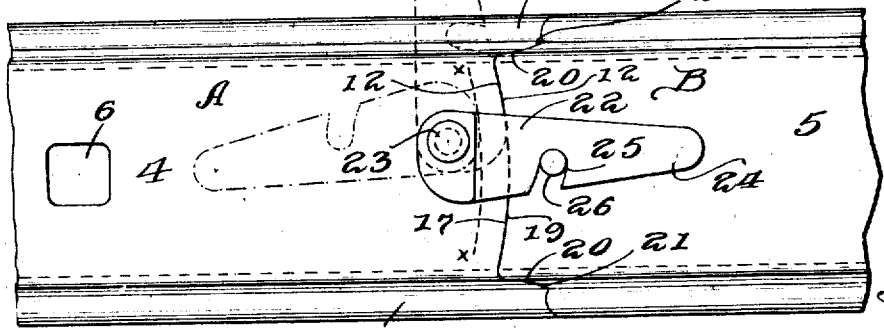
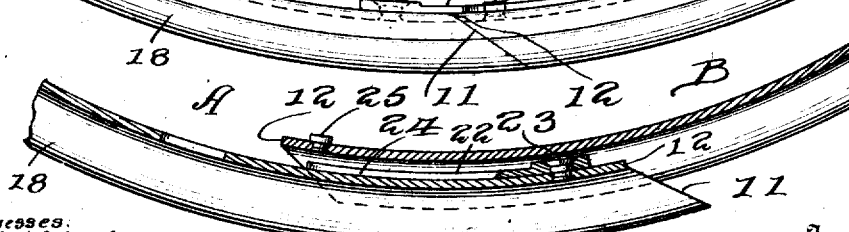
Inventor.
Elmer Oliver

UNITED STATES PATENT OFFICE.

ELMER OLIVER, OF DAYTONA, FLORIDA.

SPLIT DEMOUNTABLE RIM.

1,293,893.
Specification of Letters Patent.
Patented Feb. 11, 1919.

Application filed August 3, 1917. Serial No. 184,314.

*To all whom it may concern:*

Be it known that I, ELMER OLIVER, a citizen of the United States, residing at Daytona, in the county of Volusia and State of Florida, have invented certain new and useful Improvements in Split Demountable Rims, of which the following is a specification, reference being had therein to the accompanying drawing.

This invention relates to improvements in demountable rims for vehicle wheels, such as automobile wheels, and particularly to a demountable rim of the split sectional type, i. e., composed of two or more sections adapted for assemblage and connection to form a complete rigid tire carrying rim and for disconnection and disassemblage to "break" the rim for convenient application or removal of the tire.

The object of the present invention is to provide a sectional demountable rim the sections of which are adapted to be readily and conveniently disconnected and disassembled and as readily assembled and interlocked, the interlocking means being of a type to hold said sections securely against casual disconnection.

The invention consists of the features of construction, combination and arrangement of parts, hereinafter fully described and claimed, reference being had to the accompanying drawing, in which:—

Figure 1 is a side elevation of a wheel rim embodying my invention, showing the sections thereof assembled and a tire applied thereto.

Fig. 2 is a view on an enlarged scale looking toward the inner side of the lever locked ends of the rim.

Fig. 3 is a side elevation of the split portion of the rim shown in Fig. 2.

Fig. 4 is a longitudinal section through the same.

Fig. 5 is an outer face view of the lock-jointed ends of the rim sections.

Fig. 6 is a detail longitudinal section through the same.

Referring to the drawing, 1 designates a demountable rim of the split sectional ring type, said rim being severed transversely at the points 2 and 3 to divide the rim into two sections 4 and 5, which, for convenience of description, may be termed the body section and the detachable or removable section, respectively. The rim 1 is provided with the usual opening 6 to receive the valved inflating stem 7 of the pneumatic tire 8, and it will be observed that the rim is divided by the slips or clefts 2 and 3 into two unequal sections, the section 5 being relatively smaller than the section 4. This division of the rim into a relatively larger body section and smaller detachable or removable section is preferred, in order to facilitate the handling of the section 5 in assembling and disassembling said rim sections, although such dimensioning of the rim sections is not absolutely essential.

The split 2 is radial to the axis of the rim and extends straight across the rim so as to provide straight abutment surfaces 9 and 10 at the adjacent ends of the rim, while the split 3 extends tangentially or at an oblique angle across the rim so as to provide beveled abutment surfaces 11 and straight transverse abutment surfaces 12 at the adjacent ends of the rim. The abutment surfaces 9 and 10 are designed to provide, in conjunction with other features, a rigid lock joint at the point 2, which will normally prevent their lateral or longitudinal (circumferential) movement of either rim section, and will permit of the rim section 5 being applied and removed by sliding and pivotal motion at a prescribed angle, while the abutment surfaces 11 are designed to provide sloping surfaces which will ride easily upon each other to facilitate the connection and disconnection of the rim section 5, and the abutment surfaces 12 form square shoulders to hold the rim ends from accidentally slipping when expanded and locked together.

The lock joint at the point 2 is formed by providing the end 9 of the section 4 with a central integral projecting tongue 13 which is adapted to fit within a correspondingly formed recess 14 in the end 10 of the rim section 5, whereby said rim sections are adapted to be guided at the aforesaid point into and out of engagement and to be held firmly against relative sidewise or lateral movements. Riveted or otherwise secured to the inner face of the end 9 of the section 4 is an abutment plate 15 which projects beyond the edge of the said rim section, and riveted or otherwise secured to the inner face of the end 10 of the rim section 5 is an abutment plate 16 whose outer edge terminates short or lies inwardly of the end edge 10 of said section 5, to an extent corresponding to the extent of projection of the outer edge of the plate 15 beyond the end 9 of the rim section 4. Thus when the two rim sections 4 and 5 are coupled together at the point 2 the tongue 13 will project into the recess 14, while the projecting edge of the abutment plate or piece 15 will lap over the joint and upon the inner surface of the body of the rim section 5 and will engage the adjacent edge of the abutment plate or piece 16. The abutment plates or pieces 15 and 16 will thus coöperate to hold the joined ends of the rim sections at the point 2 against relative longitudinal or circumferential movements, and the plate 15 in extending across the cleft and abutting against the plate 16 will coöperate therewith to hold the joined ends against any tendency to buckle or move inwardly, thus making the joint absolutely rigid, as will be readily understood.

The body portion of the rim section 1 is cut away at the end 11 to provide a central recess 17 and side projecting tongues 18, which tongues are formed by the beads at the sides of the rim, while the body portion of the rim section 5 at the end 12 is cut away to provide a projecting tongue 19 which is adapted to extend in said recess 17, said tongue having lateral shoulders 20 to bear against the inner faces of the tongue 18, while the beads of the section 5 are cut away to form recesses 21 receiving the tongues 18, whereby the two ends of the rim sections at the point 3 will be locked against lateral and longitudinal (circumferential) movements, but are adapted to slide into and out of engagement on the beveled surfaces 11 when not fastened or held against such movements. As shown, the beveled surfaces 11 are formed on the tongues 18, while the square abutment surfaces 12 are formed upon the adjacent end edges of the rim body. For the purpose of connecting and holding the rim ends at the point 3 normally against movement in any direction, an eccentric fastening lever 22 is provided, which lever is pivotally mounted at one end, as indicated at 23, upon the end of the section 4 and has its opposite end arranged to form a handle 24 which is adapted, when the lever is in fastening position, to extend longitudinally of the rim and overlap the end of the rim section 5, thus holding the two sections at the point 3 against sliding movements. The lever is provided in one of its edges with an inclined or cam slot 25 adapted to engage a locking pin or stud 26 on the end of the rim section 5, whereby the lever will be frictionally held in fastening position, the cam form or inclination of the slot also serving in the locking movement of the lever to draw the abutment surfaces 11 and 12 of the rim sections together to make the joint 3 absolutely rigid and secure.

Assuming the rim sections to be connected and removed as described, and supporting a tire 8, when it is desired to break the rim or disconnect the sections thereof for removal of the tire the lever 22 is first unfastened by swinging it out of engagement with the stud 26 and backwardly over upon the rim section 4, as indicated in dotted lines in Fig. 2, such action freeing the rim ends at the point 3 for sliding movements. By then disposing the rim as shown in Fig. 1, with the rim section 5 facing downward, the joint may be broken at the point 3 by simply raising the rim and allowing it to drop forcibly against a floor or other surface, the force of the blow causing the rim end 12 of the section 5 to ride inwardly on the surface 11 of the section 4, thereby moving the rim section 5, as shown in dotted lines in Fig. 1, inwardly to a position eccentric to the axis of the rim section 4 or to the axis of the rim and tire, so that by grasping the free end of the section 4 and swinging it to a further extent inwardly the end 10 of said section will be pivotally and slidably withdrawn from engagement with the tongue 13 and abutment plate 15, as will be readily understood. The same result may be secured by disposing the rim so that the end 11 of the portion 4 faces downwardly, and depressing such end, by pressure of the foot, out of alinement with the end 12 of the section 4, which action will be permitted by the resiliency of the adjacent portion of the pneumatic tire, the joint 3 thus being broken and the rim ends separated in a quick and convenient manner, after which the rim section 5 may be removed by releasing it at the point 2 in the manner previously described. The rim section 5 having been removed in either of the ways hereinbefore set forth, it is evident that the rim section 4 may be drawn easily out of engagement with the tire 8 or the tire released therefrom in a ready and convenient manner.

In applying a tire to the rim, the rim sections are disconnected, if not already disconnected, and the tire is then first fitted upon the rim section 4, after which the end 10 of the rim section 5 is interlocked with the end 9 of the rim section 4, and the end 12 of the rim section 5 then forced outwardly by pressure of the foot or otherwise, such action causing the beveled surfaces 11 and 12 of the two sections to slide freely upon one another until they are in alinement and interlocked together, after which the lever 22 is moved to the fastening position shown in full lines in Fig. 2 and engaged with the stud 26 by means of which the joint 3 will be reinforced by the lapping arrangement of the lever and the ends 11 and 12 firmly and securely drawn and fastened together. In effecting the connection of the end 10 of the section 5 with the end 9 of the section 4, the section 5 is disposed in the eccentric position shown in dotted lines in Fig. 1 and then adjusted so as to bring the tongue 13 into engagement with the recess 15, after which the said section 5 is moved outwardly to a position approaching a true concentric relation to the axis of the rim, in which operation the interlocking elements upon the ends 9 and 10 are brought into engagement by a combined pivotal and sliding motion, after which the rim ends 11 and 12 are brought together and fastened as previously described. By reason of the fact that, in effecting the engagement and disengagement of the rim ends 9 and 10, it is necessary to dispose the rim section 5 in an eccentric position and connect said rim ends by a combined swinging or pivotal and sliding motion, it is evident that when the rim end 5 is in normal position and fastened by the lever 22 it will be absolutely rigid with the rim section 4, so that said rim sections can not become casually separated or disassembled. When the rim and tire are placed in position upon the wheel, the lever 22 will be housed and protected and will be held from all liability of a casual releasing action.

It will thus be seen that my invention provides a sectional demountable rim in which the sections are so combined as to permit of their assemblage and disassemblage without the use of either applied tools, forming part of the rim, or separate and independent tools, and that while the rim sections may be easily and conveniently connected and disconnected they will be normally held rigid against disconnection or displacement of the tire. Also it will be seen that the end 10 of the section 5 may be coupled with the end 9 of the section 4 without the necessity of disposing the section 5 in an awkward or inconvenient position, and also without the necessity of making the coupling means between said rim ends of such a character as to render it difficult to bring the same into and out of coacting engagement.

Having thus fully described my invention, I claim:

1. A rim including a removable section having at one end a detachable slidable and pivotal connection at one end with one end of the rim body, whereby said removable section is adapted to be pivotally swung within the circumference of the rim in an arc between positions eccentric to and concentric with the rim axis for respectively disposing said detachable section in position for disconnection and to complete the rim formation, and means for coupling said removable section at its opposite end to the opposite end of the rim body, said detachable and pivotal connections comprising interfitting and abutting elements, said elements being operative to hold the first named ends of the rim members against lateral displacement and said rim members against relative radial swinging movement beyond the circumference of the rim, and also to hold the first named ends of the rim members rigidly against inward movement when the latter named ends of the rim members are coupled.

2. A demountable rim including a body section having a slot at one end thereof, a removable section having at one end a longitudinally extending tongue to slidably and pivotally engage said slot, an abutment member upon the inner face of the body section projecting beyond the end thereof to a less extent than said tongue, an abutment plate upon the inner face of the removable section partially closing the inner side of the slot and terminating inwardly of the end of said section, and means for coupling the sections at their opposite ends.

3. A demountable rim comprising a body section, a detachable section, said sections having straight transverse abutment surfaces at one end and beveled sliding abutment surfaces at the opposite end, said sections being also provided at the first named end with longitudinally extending interfitting tongued and recessed portions, one of said sections being provided with an abutment plate lying inwardly of the end thereof and the other section being provided with an abutment plate projecting beyond its end for lapping engagement with the first named section and abutting engagement with the first named abutment plate, said abutment plates being arranged and operating to permit relative sliding movements of the sections and relative radial pivotal movements of said sections within the line of the circumference of the rim, while preventing relative radial pivotal movements of the sections outwardly beyond the line of the circumference of the rim, the opposite ends of said sections being adapted for sliding engagement, and means connecting the latter named ends of the sections together, said tongue and abutment plates further serving to lock the first named rim ends rigidly against inward movement when the rim sections are united for use.

4. A split demountable rim comprising a body section and a removable section, said sections having adjacent end portions adapted for interlocking engagement, the end portion of the body section being provided with a projecting tongue and an abutment piece extending therefrom a distance less than the length of the tongue, and the end portion of the removable section being provided with a slot to receive said tongue, and an abutment piece extending across the inner portion of the slot, said abutment pieces being disposed upon the inner faces of said sections and arranged to respectively overlap the end of the removable section and the tongue when the sections are coupled, whereby said sections are held from lateral and outward radial movement and the removable section is adapted to be disposed eccentrically to the axis of the rim and the parts mentioned brought into engagement by sliding and pivotal movements in the adjustment of the removable section from an eccentric to a concentric position, the opposite ends of the sections being arranged for coupling engagement when the removable section is disposed in concentric position, and means for coupling the latter named ends of the sections.

5. A split demountable rim comprising a body section and a removable section, said sections having adjacent end portions adapted for interlocking engagement, the end portion of the body section being provided with a projecting tongue and an abutment piece extending therefrom a distance less than the length of the tongue, and the end portion of the removable section being provided with a slot to receive said tongue, and an abutment piece extending across the inner portion of the slot, said abutment pieces being disposed upon the inner faces of said sections and arranged to respectively overlap the end of the removable section and the tongue when the sections are coupled, whereby said sections are held from lateral and outward radial movement and the removable section is adapted to be disposed eccentrically to the axis of the rim and the parts mentioned brought into engagement by sliding and pivotal movements in the adjustment of the removable section from an eccentric to a concentric position, the opposite ends of the sections being provided with beveled surfaces for sliding engagement with each other in the movement of the removable section from eccentric to concentric position, and means for coupling the sliding ends of the sections together.

In testimony whereof I hereunto affix my signature in the presence of two witnesses.

ELMER OLIVER.

Witnesses:
R. H. STATON,
K. M. SWEEGAR.